United States Patent
Camilo et al.

(10) Patent No.: US 10,954,828 B2
(45) Date of Patent: Mar. 23, 2021

(54) VARIABLE CAMSHAFT PHASER WITH MAGNETIC LOCKING COVER BUSHING

(71) Applicant: Schaeffler Technologies AG & Co. KG, Herzogenaurach (DE)

(72) Inventors: Alexandre Camilo, Rochester Hills, MI (US); Willian Jose Pedretti, Shelby Township, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/390,441

(22) Filed: Apr. 22, 2019

(65) Prior Publication Data

US 2020/0332682 A1    Oct. 22, 2020

(51) Int. Cl.
| | |
|---|---|
| *F01L 1/344* | (2006.01) |
| *B21D 22/02* | (2006.01) |
| *B21D 53/84* | (2006.01) |

(52) U.S. Cl.
CPC ............ *F01L 1/3442* (2013.01); *B21D 22/02* (2013.01); *B21D 53/845* (2013.01); *F01L 2001/34423* (2013.01); *F01L 2001/34456* (2013.01); *F01L 2001/34469* (2013.01); *F01L 2303/00* (2020.05)

(58) Field of Classification Search
CPC ... F01L 2001/34423; F01L 2001/34456; F01L 2001/34469; F01L 2001/34433; F01L 2001/34476; F01L 2001/34453; F01L 2103/00; F01L 2001/34436; B21D 22/02; B21D 53/845

USPC ................. 123/90.15, 90.16, 90.17
See application file for complete search history.

(56) References Cited

U.S. PATENT DOCUMENTS

| | | | |
|---|---|---|---|
| 6,637,390 B1* | 10/2003 | Dauer | F01L 1/3442 |
| | | | 123/90.15 |
| 6,948,467 B2* | 9/2005 | Lipke | F01L 1/022 |
| | | | 123/90.15 |
| 7,318,400 B2 | 1/2008 | Lipke et al. | |
| 10,054,015 B2 | 8/2018 | Becker | |
| 2008/0289594 A1 | 11/2008 | Kleiber | |
| 2014/0007831 A1* | 1/2014 | Heinemann | F01L 1/3442 |
| | | | 123/90.17 |
| 2016/0024978 A1* | 1/2016 | Lichti | F01L 1/34409 |
| | | | 123/90.15 |
| 2018/0058274 A1* | 3/2018 | Lichti | F01L 1/3442 |
| 2018/0119581 A1* | 5/2018 | De Oliveira Ghiraldi | |
| | | | F01L 1/34403 |
| 2018/0252123 A1* | 9/2018 | Mlinaric | F01L 1/3442 |

(Continued)

*Primary Examiner* — Jorge L Leon, Jr.
(74) *Attorney, Agent, or Firm* — Volpe Koenig (57) ABSTRACT

A variable camshaft phaser is provided having a stator attached to a driving part, and a rotor located within the stator and attached to a driven part. First and second cover plates are located on respective first and second axial sides of the stator. Inwardly directed vanes of the stator, the rotor, and the first and second cover plates define at least one chamber. Radially outwardly directed vanes of the rotor divide the at least one chamber into an advance side working chamber and a retard side working chamber. A locking pin bore is located in the rotor, and a locking pin is located in the locking pin bore. One of the first and second cover plates includes a locking pin receiving opening. A magnetic part is located in the locking pin receiving opening to remove metallic particles and contaminants from the flow of pressurized hydraulic fluid.

5 Claims, 6 Drawing Sheets

(56) References Cited

U.S. PATENT DOCUMENTS

2019/0063270 A1\* 2/2019 Haltiner, Jr. ........ F01L 1/34409

\* cited by examiner

VARIABLE CAMSHAFT PHASER WITH MAGNETIC LOCKING COVER BUSHING

FIELD OF INVENTION

This application is generally related to a variable camshaft phaser, and is more particularly related to the locking pin arrangement used to lock the camshaft adjuster in a fixed timing position.

BACKGROUND

Camshaft phasers are used in internal combustion engines for varying the timing of the combustion chamber intake and exhaust valves in order to be able to variably configure the phase relation between a crankshaft and a camshaft in a defined angular range between a maximum advanced position and a maximum retarded position. Adapting the timing to the instantaneous load and speed decreases the fuel consumption and reduces the emissions. For this purpose, camshaft phasers are integrated into a drive train, via which torque is transmitted from the crankshaft to the camshaft. This drive train may be designed as a belt drive, chain drive, or gearwheel drive, for example.

One type of camshaft phaser is a hydraulic camshaft adjuster, in which the output element and the drive element form one or multiple pairs of oppositely acting pressure chambers which may be acted on by hydraulic medium, typically pressurized engine oil. The drive element and the output element are situated coaxially. The filling and emptying of individual pressure chambers generates a relative movement between the drive element and the output element. A spring acting between the drive element and the output element pushes the drive element with respect to the output element in a preferred direction. This preferred direction may be the same as or opposite to the rotation direction. A locking pin arrangement can be used to couple the drive element and the output element in a preferred position, for example, for startup or other low oil pressure condition.

The vane cell adjuster is one design of the hydraulic camshaft adjuster. The vane cell adjuster includes a stator, a rotor, and a drive wheel having external teeth. The rotor is designed as an output element, usually having a design that is connectable to the camshaft in a rotatably fixed manner. The drive element includes the stator and the drive wheel. The stator and the drive wheel are connected to one another in a rotatably fixed manner, or alternatively are designed as one part. The rotor is situated coaxially with respect to the stator, and within the stator. With their radially extending vanes, the rotor and the stator form oppositely acting oil chambers which may be acted on by oil pressure and which allow a relative rotation between the stator and the rotor. The vanes are designed either as one part with the rotor or the stator, or as an "inserted vane" in grooves in the rotor or the stator which are provided for this purpose. In addition, the vane cell adjusters have various sealing and locking covers. The stator, the sealing cover, and the locking cover are secured together preferably via multiple screw connections.

One issue in these hydraulic camshaft adjusters is that after some use but prior to the intended service life, the locking pin can become stuck inside the rotor. The root cause has been identified as contamination found inside the variable camshaft phaser components (i.e. contamination from the engine oil). It would be desirable to avoid this type of contamination and premature failure of the hydraulic camshaft adjuster.

SUMMARY

A variable camshaft phaser is provided having a stator attached to a driving part, with the stator including a plurality of radially inwardly directed vanes. A rotor is located within the stator and adapted to be attached to a driven part, with the rotor including at least one radially outwardly directed vane. First and second cover plates are located on respective first and second axial sides of the stator. The inwardly directed vanes of the stator, the rotor, and the first and second cover plates define at least one chamber. The at least one radially outwardly directed vane of the rotor divides the at least one chamber into an advance side working chamber and a retard side working chamber. A locking pin bore is located in the rotor, and a locking pin is located in the locking pin bore. One of the first and second cover plates includes a locking pin receiving opening. A magnetic part is located in the locking pin receiving opening, spaced apart from the locking pin in a fully extended position of the locking pin. The magnetic part is used to remove metallic particles and contaminants from the flow of pressurized hydraulic fluid used to actuate the locking pin.

Preferably, the variable camshaft phaser includes a locking bushing that forms the locking pin receiving opening. The locking bushing is located in a bushing opening in the one of the first and second cover plates including the locking pin receiving opening.

Preferably, the magnetic part is located at a base of the locking bushing. In the preferred embodiment, the magnetic part is a magnetic ring, and the locking bushing includes a ring-shaped groove in the base in which the magnetic ring is located. However, it is also possible to use one or more ring-shaped magnetic segments, or separate magnets installed in a generally ring-shaped configuration. The base may also include one or more axially directed projections that act as a stop to prevent the locking pin from contacting the magnetic part.

In one arrangement, the locking bushing is a stamped part, and the ring-shaped groove is stamped into the base of the locking bushing during formation, preferably at a juncture between the cylindrical wall and the base. Preferably, the magnetic ring is press fit into the ring-shaped groove.

The locking bushing is preferably press fit into the bushing opening in the locking cover.

In another aspect, a method of producing a locking bushing for a locking cover of a variable camshaft phaser locking assembly is provided. The method includes stamping a sheet metal blank to form the locking bushing, forming a ring-shaped groove on an inner base of the locking bushing during the stamping, and press-fitting a magnetic ring into the ring-shaped groove.

The method further includes press-fitting the locking bushing into a bushing opening in the locking cover.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Figure 1:
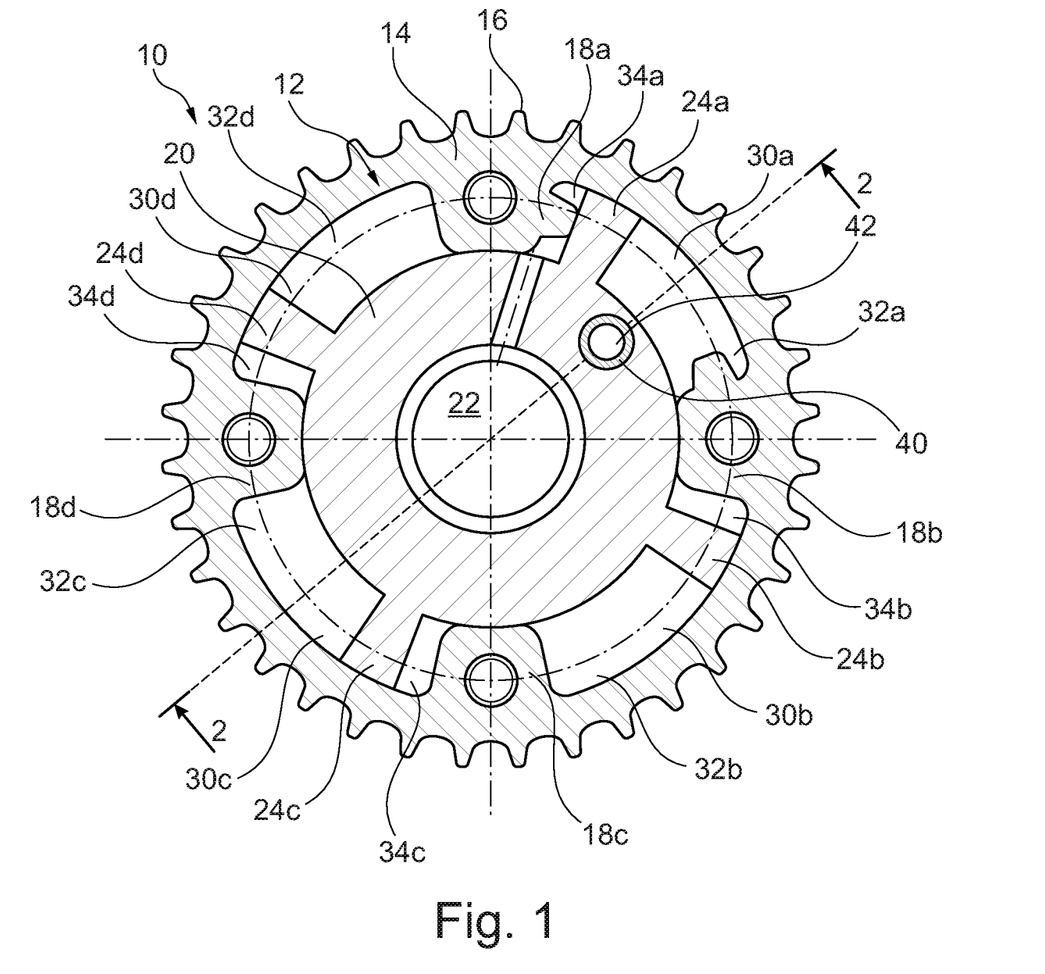
FIG. 1 is schematic view of a camshaft phaser.
Figure 2:
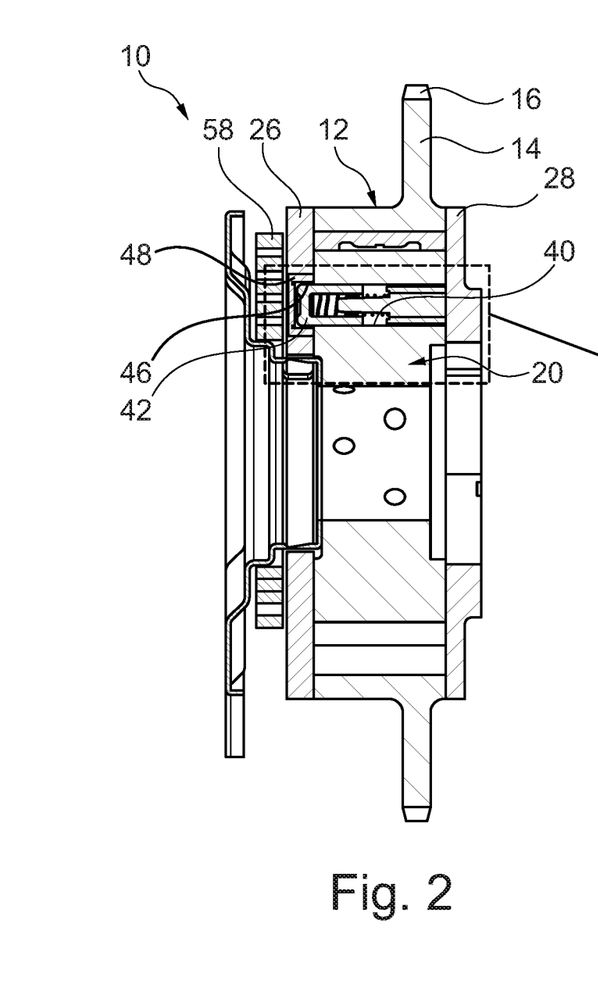
FIG. 2 is a cross-sectional view taken along line 2-2 in FIG. 1.
Figure 3:
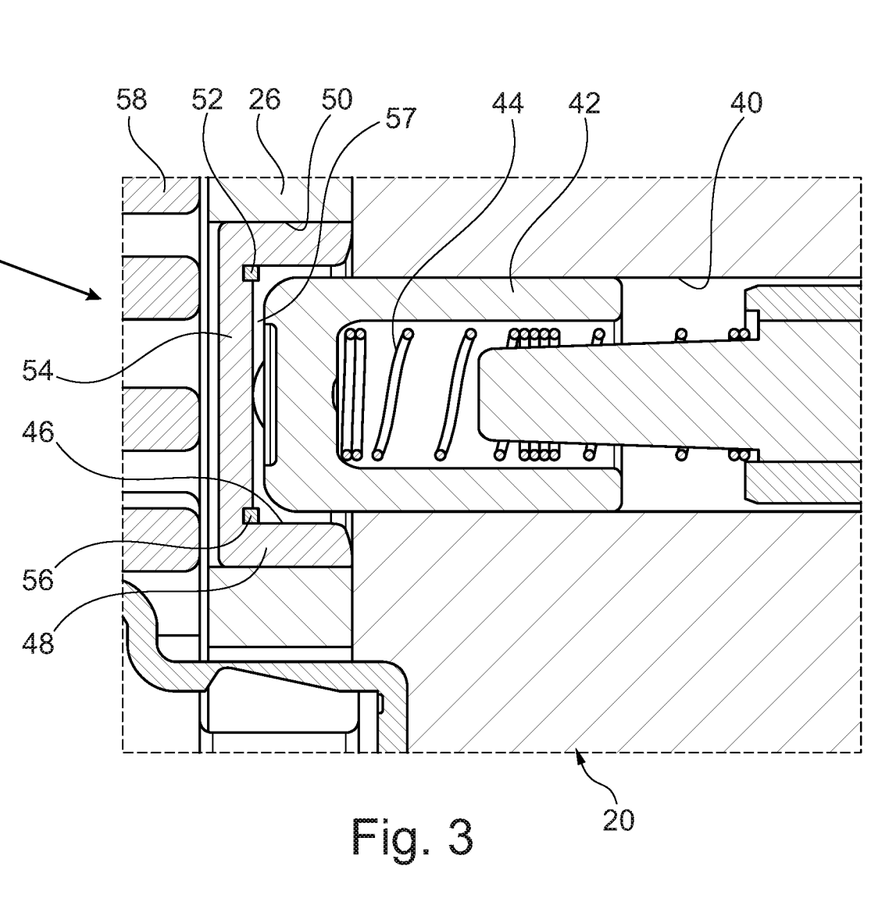
FIG. 3 is an enlarged detail view taken from the indicated area in FIG. 2.
Figure 4:
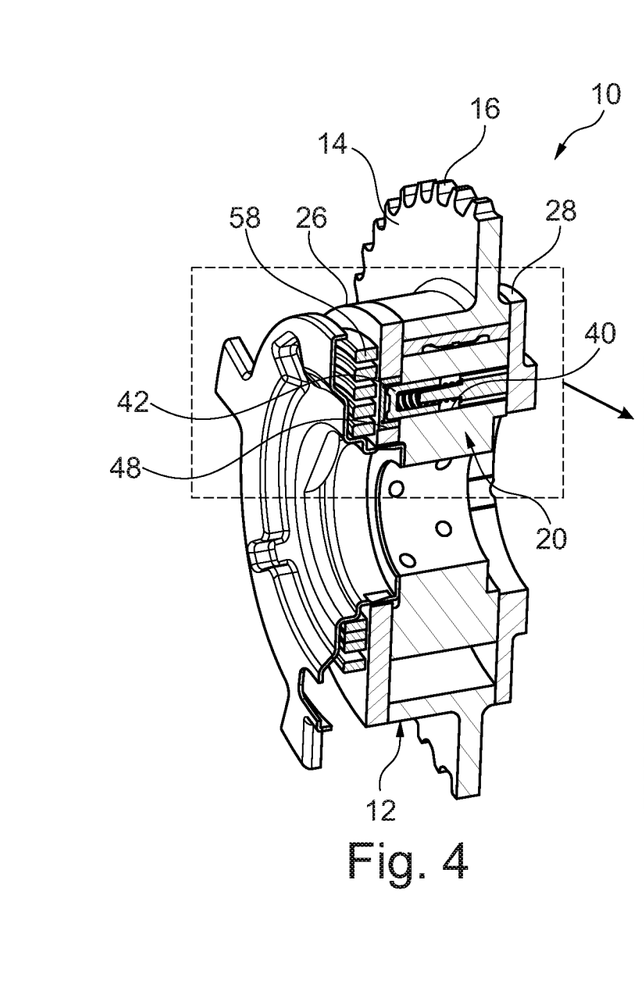
FIG. 4 is a perspective view, partially in cross-section, of the camshaft phaser shown in FIG. 1.
Figure 5:
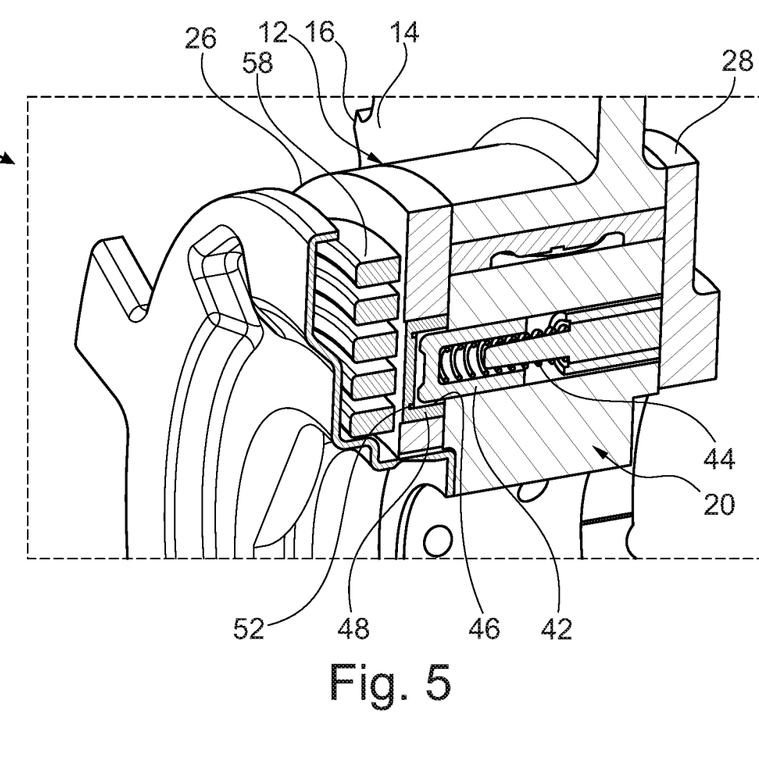
FIG. 5 is an enlarged detail view taken from the indicated area in FIG. 4.

Referring to FIGS. 1, 2, and 4, a variable camshaft phaser 10 is shown. The camshaft phaser 10 is in the form of a hydraulic camshaft adjuster and includes a stator 12 attached to a driving part 14, shown as a sprocket 16, which is adapted to be connected to a crankshaft of an internal combustion engine. The sprocket 16 can be integrally formed with the stator 12 or can be a separate part that is fastened to the stator 12. The stator 12 includes a plurality of radially inwardly directed vanes 18a-18d.

A rotor 20 is located within the stator 12 and is adapted to be attached to a driven part, shown in FIG. 1 as the camshaft 22. The rotor 20 includes at least one radially outwardly directed vane 24a, and preferably four outwardly directed vanes 24a-24d. These radially outwardly directed vanes are located between the radially inwardly directed vanes 18a-18d of the stator 12. The radially outwardly directed vanes 24a-24d can be integrally formed on the rotor 20, or can be separate parts that are connected to the rotor 20.

First and second cover plates 26, 28 are located on respective first and second axial sides of the stator 12. The first cover plate 26 typically faces away from the engine.

The inwardly directed vanes 18a-d of the stator 12, the rotor 20 and the first and second cover plates 26, 28 define at least one chamber 30a, and in the illustrated embodiment define four chambers 30a-30d, and the at least one radially outwardly directed vane 24a-24d of the rotor 20 divides the at least one chamber 30a-30d, and in the illustrated embodiment, divide all four chambers 30a-30d into an advance side working chamber 32a-32d and a retard side working chamber 34a-34d.

Pressurized fluid channels are connectable to the respective advance side working chambers 32a-32d and to the retard side working chambers 34a-34d such that by supplying pressurized fluid, preferably engine oil from the lubrication circuit, to the respective advance side working chambers 32a-32d or to the retard side working chambers 34a-34d, the rotor 20 is rotated relative to the stator 12 to advance or retard the camshaft movement relative to the crankshaft so that the valve opening positions are varied to enhance performance, reduce fuel consumption and increase the burn efficiency. Applying fluid pressure to both the respective advance side working chambers 32a-32d and to the retard side working chambers 34a-34d holds the stator 12 and rotor 20 in a fixed position relative to one another.

In the event of low or no hydraulic fluid pressure, an optional return spring 58 can be provided between the stator 12 and the rotor 20 that biases the rotor 20 to a desired start position. The spring 58 can be a coil spring as shown or any other type of suitable spring. It is also possible for a variable camshaft phaser to return to a desired base position via the applied torques and torsional inertia of the components so that no spring is needed.

In order to lock the rotor 20 in position relative to the stator 12 at low or no hydraulic fluid pressure, a locking mechanism is provided. This includes a locking pin 42 that is located in a locking pin bore 40 in the rotor 20. The locking pin 42 is biased by a spring 44 located in the locking pin bore 40 toward a locked position. When sufficient hydraulic fluid pressure is provided, the force of the spring 44 is overcome, and the locking pin 42 is moved into the bore 40 sufficiently to allow relative movement between the rotor 20 and the stator 12.

Figure 6:
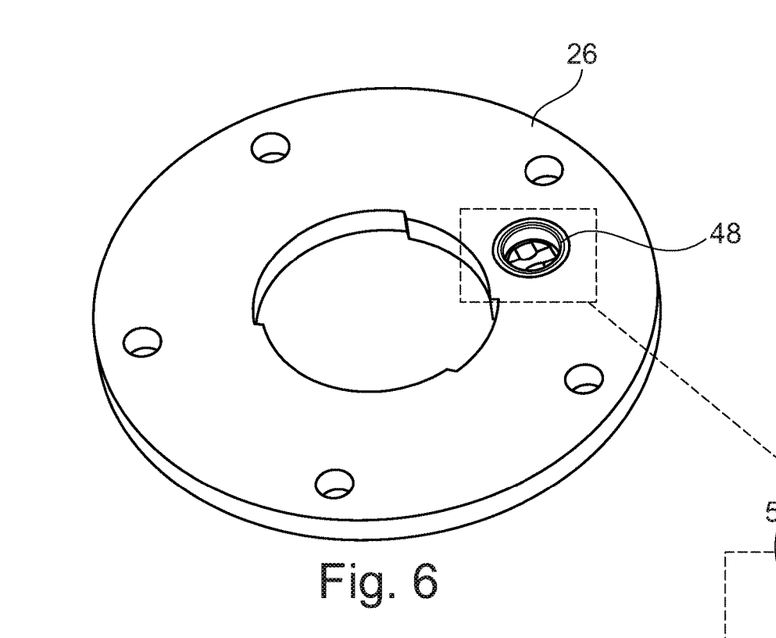
FIG. 6 is a perspective view of the locking cover plate for the camshaft phaser of FIG. 1.

As shown in FIGS. 2-5, in the locking position, the locking pin 42 is received in a locking pin receiving opening 46 in one of the first and second cover plates 26, 28, preferably the first cover plate 26 which can be referred to as the locking cover plate. Preferably, a locking bushing 48 that forms the locking pin receiving opening 46 is located in a bushing opening 50 in the locking cover plate, which in the illustrated embodiment is the first cover plate 26, shown in detail in FIG. 6. Preferably there is a clearance between the outside diameter of the locking pin 42 and the inside diameter of the locking pin receiving opening 46, which can be, for example, 0.5-1.0 mm.

In order to remove metallic particles or other magnetically attractable contaminants from the hydraulic fluid that may cause the locking pin 42 to malfunction or become jammed in its bore 40, a magnetic part, shown as magnetic ring 52, is located in the locking pin receiving opening 46. Preferably, the magnetic part is located at a base 54 of the locking bushing 48. The magnetic part is preferably in the form of the magnetic ring 52, and the locking bushing 48 includes a ring-shaped groove 56 in the base 54 in which the magnetic ring 52 is located. The base 54 may also include one or more axially directed projections 57 that act as a stop to prevent the locking pin 42 from contacting the magnetic ring 52. Further, the end of the locking pin 42 is preferably domed, forming an enlarged annular space or gap between the end of the locking pin 42 and the base 54 of the locking bushing 48 as well as the magnetic ring 52 where particles that are captured by the magnetic ring 52 can be held without interfering with the functioning of the locking pin 42.

Figure 7:
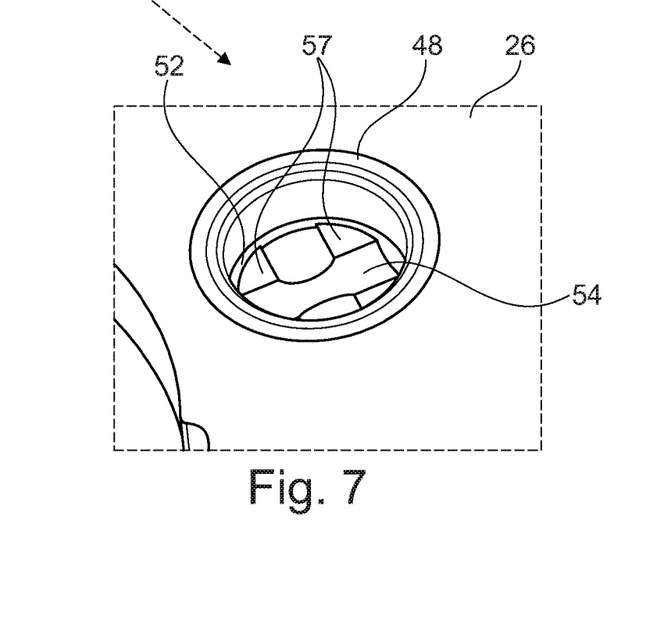
FIG. 7 is an enlarged detail view taken from the indicated area in FIG. 6 showing the locking bushing in the locking cover.
Figure 8:
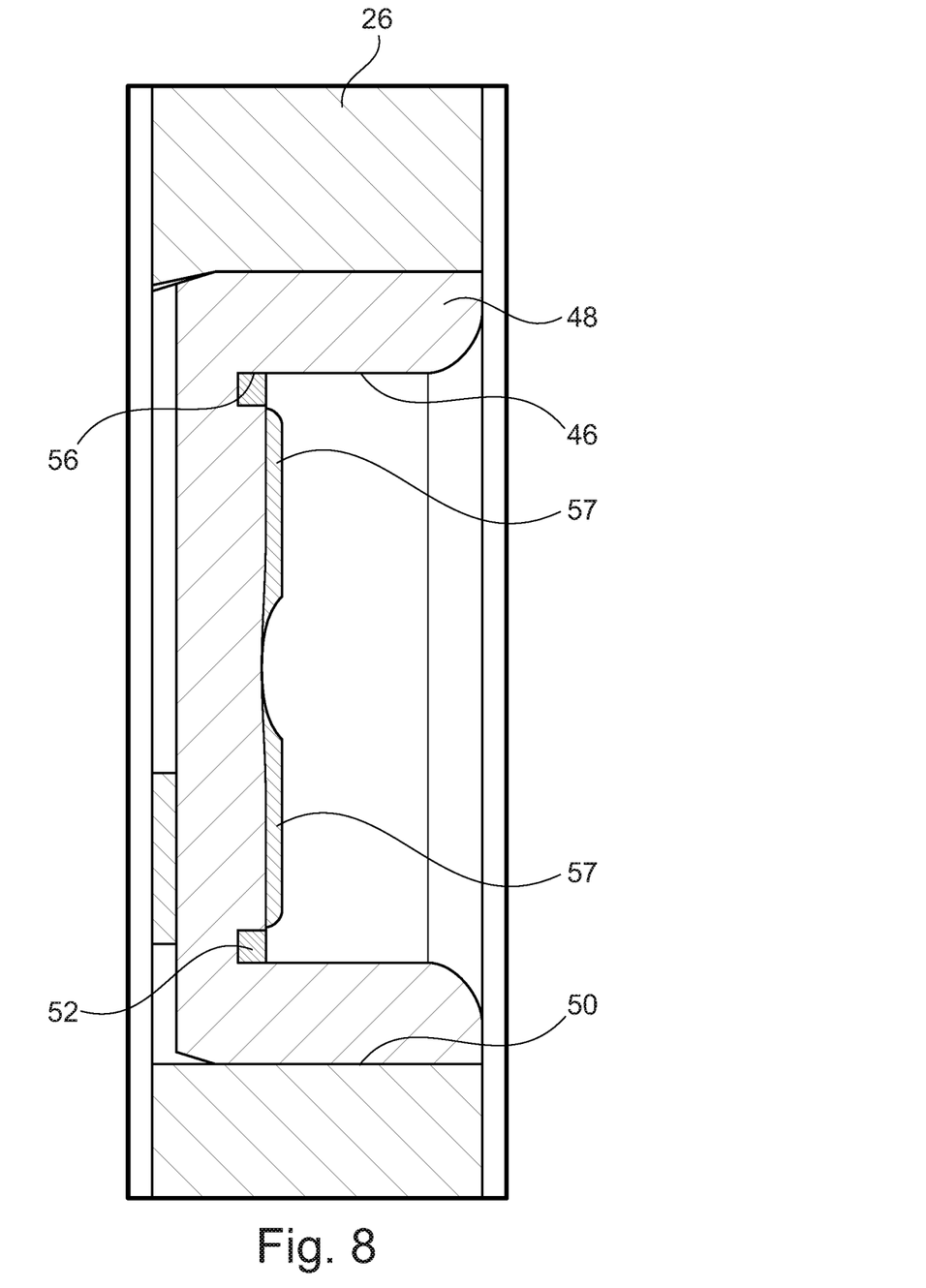
FIG. 8 is an enlarged cross-sectional view through the locking bushing show in FIG. 7.

The locking bushing 48 is show in detail in FIGS. 7 and 8, and is preferably formed as a stamped sheet-metal part. The ring-shaped groove 56 is preferably stamped into the base 54 of the locking bushing 48 during formation. Alternatively, it could be machined, stamped or otherwise formed in a secondary operation. The magnetic ring 52 is then preferably press fit into the ring-shaped groove 56. However, it could be attached by other means, such as staking, clinching, welding or an adhesive. Additionally, the magnetic ring 52 could be provided as separate partial ring-shaped segments or straight segments in contact with or spaced apart from one another that are arranged to approximate a ring shape, which for the purposes of the present disclosure are considered to be within the scope and meaning of term magnetic ring.

Once assembled with the magnetic ring 52, the locking bushing 48 is preferably press fit into the bushing opening 50.

Figure 9:
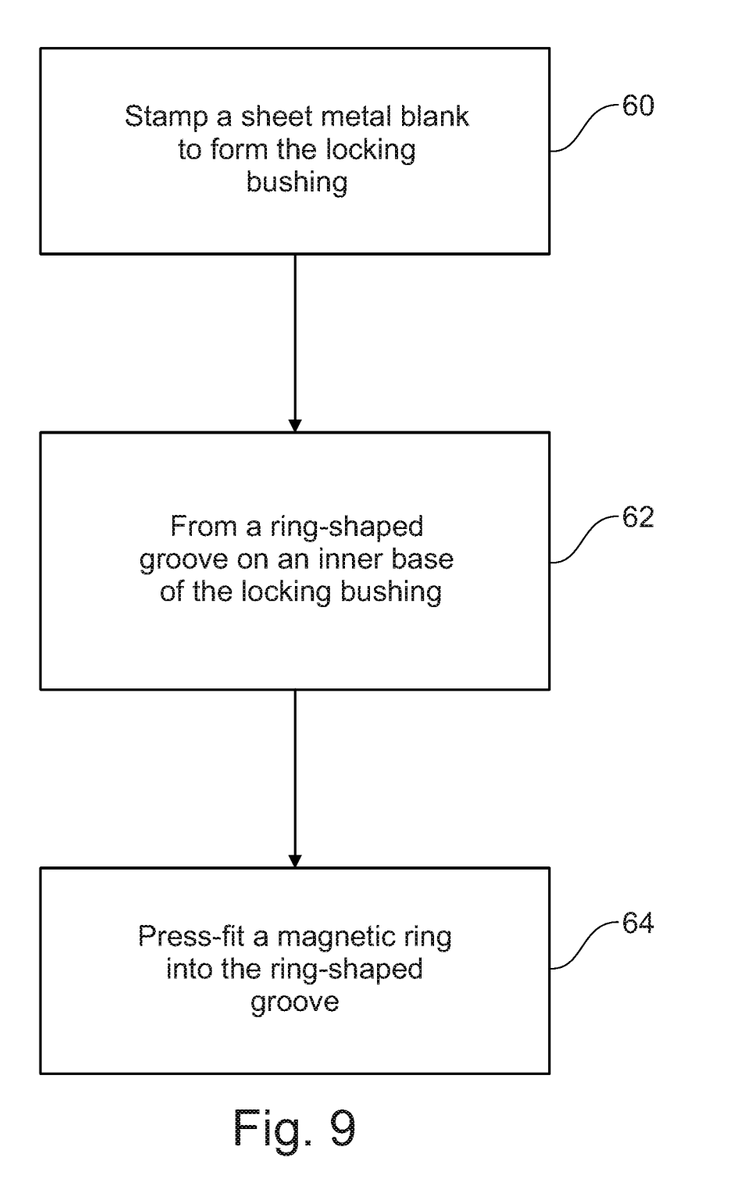
FIG. 9 is a flow chart showing a method of forming the locking bushing with a magnetic ring.

Referring to FIG. 9, a method of producing the locking bushing 48 for a locking cover of a variable camshaft phaser 10 is explained. As shown in the first step 60, a sheet metal blank is stamped to form the locking bushing 48. In the second step 62, a ring-shaped groove 56 is formed on an inner side of the base 54 of the locking bushing 48, preferably during the stamping process in the first step 60. Alternatively, the groove 56 could be machined. In a third step 64, the magnetic ring 52 is press-fit into the ring-shaped groove 56. Once this is complete, the locking bushing 48 with the installed magnetic ring 52 is press-fit into the bushing opening 50 in the locking cover 48.

Having thus described various embodiments of the present variable camshaft phaser in detail, it will be appreciated and apparent to those skilled in the art that many changes, only a few of which are exemplified in the detailed description above, could be made in the variable cam phaser system according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LIST OF REFERENCE NUMERALS

10 Camshaft phaser
12 Stator
14 Driving part
16 Driving sprocket
18*a-d* Radially inwardly directed vanes
20 Rotor
22 Camshaft
24*a-d* Radially outwardly directed vanes
26 First cover plate
28 Second cover plate
30*a-d* Chambers
32*a-d* Advance side working chambers
34*a-d* Retard side working chambers
40 Locking pin bore
42 Locking pin
44 Locking spring
46 Locking pin receiving opening
48 Locking bushing
50 Bushing opening
52 Magnetic ring
54 Base
56 Ring-shaped groove
57 Projections
58 Return spring
60 Step 1
62 Step 2
64 Step 3

What is claimed is:

1. A variable camshaft phaser, comprising:
a stator attached to a driving part, the stator including a plurality of radially inwardly directed vanes;
a rotor located within the stator and adapted to be attached to a driven part, the rotor including at least one radially outwardly directed vane;
first and second cover plates located on respective first and second axial sides of the stator,
the plurality of radially inwardly directed vanes of the stator, the rotor and the first and second cover plates defining at least one chamber, and the at least one radially outwardly directed vane of the rotor divides the at least one chamber into an advance side working chamber and a retard side working chamber;
a locking pin bore located in the rotor;
a locking pin located in the locking pin bore;
one of the first and second cover plates including a locking pin receiving opening;
a magnetic part located in the locking pin receiving opening, spaced apart from the locking pin in a fully extended position of the locking pin; and
a locking bushing that forms the locking pin receiving opening, the locking bushing being located in a bushing opening in the one of the first and second cover plates including the locking pin receiving opening,
wherein the magnetic part is located at a base of the locking bushing, and
wherein the magnetic part is a magnetic ring, and the locking bushing includes a ring-shaped groove in the base in which the magnetic ring is located.

2. The variable camshaft phaser of claim 1, wherein the locking bushing is a stamped part.

3. The variable camshaft phaser of claim 2, wherein the ring-shaped groove is stamped into the base of the locking bushing during formation of the locking bushing.

4. The variable camshaft phaser of claim 3, wherein the magnetic ring is press fit into the ring-shaped groove.

5. The variable camshaft phaser of claim 2, wherein the ring-shaped groove is machined into the base of the locking bushing.

* * * * *